United States Patent

Pigeon

[11] 4,060,258
[45] Nov. 29, 1977

[54] TOW TRUCK DOLLY

[76] Inventor: Norbert G. Pigeon, 59 Rg Nord West, R.R. No. 1, Ste. Madeleine Co., St. Hyacinthe, Canada, J0H 1S0

[21] Appl. No.: 698,774

[22] Filed: June 22, 1976

[51] Int. Cl.² ............................................. B62B 3/02
[52] U.S. Cl. ............................... 280/638; 280/79.1 A
[58] Field of Search ..................... 280/79.1 A, 79.1 R, 280/656, 639, 638

[56] References Cited

U.S. PATENT DOCUMENTS

| | | | |
|---|---|---|---|
| 2,943,863 | 7/1960 | Corey et al. | 280/79.1 A |
| 2,961,250 | 11/1960 | Beach | 280/79.1 A X |
| 3,066,946 | 12/1962 | Nelson | 280/79.1 A |

FOREIGN PATENT DOCUMENTS 686,892  5/1964  Canada ................................. 280/656

Primary Examiner—Joseph F. Peters, Jr.
Assistant Examiner—Michael J. Forman
Attorney, Agent, or Firm—Roland L. Morneau

[57] ABSTRACT

A dolly member for supporting a wheel of a towed vehicle comprising a rectangular frame, a trough member supported by said frame for receiving a wheel of a towed vehicle, a pair of longitudinally aligned wheels pivotally mounted on one side of the frame, a beam transversely secured to said frame on the side opposite the wheels, a stirrup-shaped member rigidly secured sideways near the end of said beam, whereby when a pair of such dolly members are disposed opposite one another and the beams are adjacent one another, the stirrup-shaped member is adapted to hook onto the beam of the opposite dolly member.

7 Claims, 3 Drawing Figures

TOW TRUCK DOLLY

The present invention relates to a dolly member for supporting a wheel of a towed vehicle and more particularly to a new means for connecting two dolly members together for supporting two adjacent wheels of a towed vehicle.

Dolly members are interconnected by telescopically adjustable arrangements in order to be fitted to the width of the vehicles to be towed. The majority of the known dolly members uses mutually interfitting tubular members which are adapted to slide one into the other. In order to accommodate the variety of widths of most cars and trucks on the market, the tubular members must be adapted to slide over a length of about one to four feet. Considering that these tubular members are generally roughly made, they do not slide smoothly. If they are fitted too tightly, the sliding is obtained by force and if they are fitted too loosely, they shake one into the other while in movement. Furthermore, the tubular members slide very ackwardly because the weight of the whole dolly member must be moved sideways. The dolly members rest on rubber tires which have a high coefficient of friction on the pavement and resist sliding.

The hooking member according to the invention overcomes such disadvantages of the telescopically mounted tubular members.

The new dolly members according to the invention can be easily hooked one to the other at the required distance. Furthermore, the new hooking members according to the invention, can support a very heavy vehicle.

Another additional characteristic of the invention resides in the fact that this hooking arrangement is very simple and economical to manufacture.

It is another characteristic of the invention to facilitate the relative positioning of two dolly members at the desired distance from one another while obtaining a solid connection when hooked to each other.

Further advantages of the invention will become obvious from the following description while referring to drawings in which.

Figure 1:
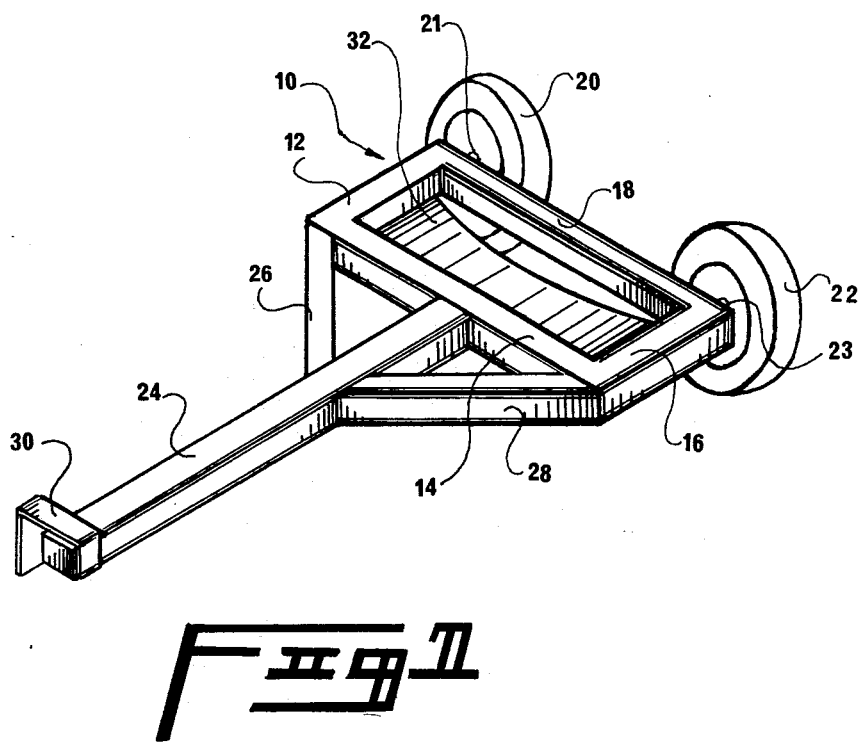
FIG. 1 is a perspective view of one dolly member.

The dolly member illustrated in FIG. 1 comprises a frame member 10 comprising four bars 12, 14, 16 and 18 arranged to form the four sides of a rectangle. A pair of longitudinally aligned wheels 20 and 22 are pivotally mounted about axles 21 and 23 on the frame 10 and in particular on the bar 18. A solid beam 24 is rigidly secured transversely on said frame 10 on the side opposite the wheels 20 and 22. The rigidity of the beam 24 to the frame 10 is increased by tangent beams 26 and 28. A stirrup-shaped member 30 is welded at the end of the beam 24 in a crosswise direction. The member 30 is so shaped so as to form an opening adjacent the end of the beam 24 of a size approximately the size of the beam 24.

A solid plate 32 which has the general configuration of a portion of a cylindroid is welded to the bars 12 and 16 so as to constitute the base of a trough for receiving a wheel of a towed vehicle.

Figure 2:
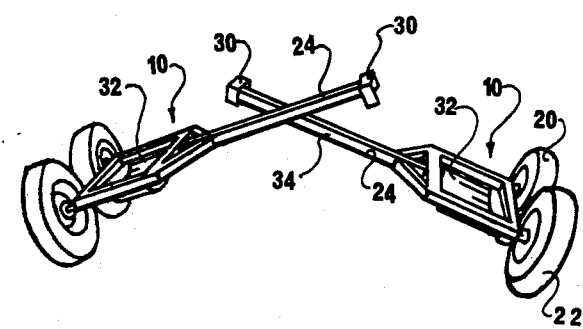
FIG. 2 is a front perspective view of two dolly members connected to each other.

Two identical dolly members such as described in FIG. 1 are positioned one facing the other, as shown in FIG. 2, in a position so that they will hook to one another. The hooking arrangement will take place by spacing the wheels 20 and 22 of each dolly member apart from each other so that the troughs 32 will be at the desired position, that is, at the distance corresponding to the distance of the wheels of the vehicle to be towed. In that position, the beams 24 are ositioned in a parallel direction and adjacent one another. In this position, the beams are angularly disposed relative to the horizontal and are brought down to the horizontal position so that the stirrup-shaped members 30 will grip onto the beam 24 of the opposite dolly member. When the final position will be reached, the two dolly members will have the appearance shown in FIG. 3, that is, the stirrup-shaped members 30 will firmly hook over the beam 24 of the opposite dolly member. In this position, a considerable weight can be introduced into the trough members 32 and can be maintained in its raised position because it is supported by a lever equal to the distance of the corresponding hooked member 30 to the bar 14.

Figure 3:
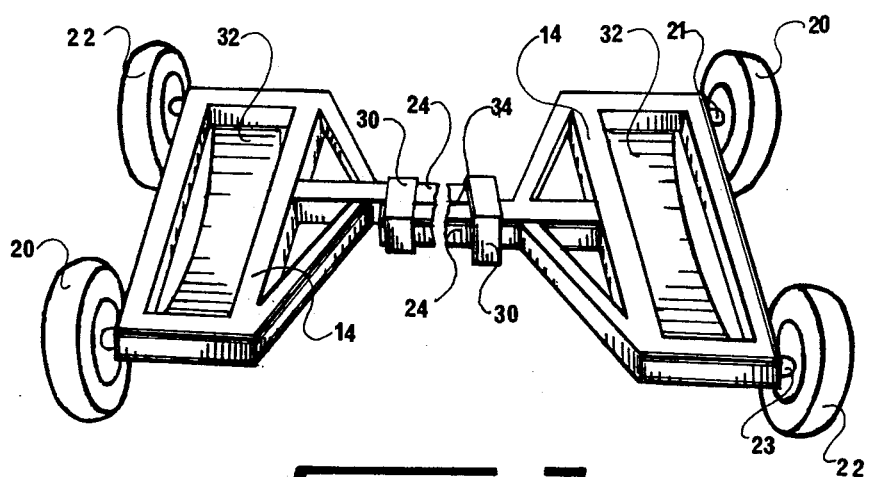
FIG. 3 is a perspective view of two dolly members in a position before they become hooked.

Because the dolly members are intended to carry two front or two rear wheels of a vehicle, and that these wheels are aligned or in the same plane, it is important that the two plates 32 in the troughs be also aligned with each other. For this purpose, the beam 24 will be off center relative to the median plane between the two axles 21 and 23. The beam 24 will be off center by a distance equal to half its width. Accordingly, the surface 34 of the beam 24 as shown in FIG. 3, will fall substantially in line with the middle of the trough of the dolly. It is to be expected that both wheels 20 and 22 will be substantially located at an equal distance from the median line of the trough so as to equally support the wheel of the towed vehicle adapted to be contained in the trough.

Although only one beam 24 has been described to interconnect the two dolly members, it should be obvious that two or three may be used if additional strength is required. It should also be obvious that the two beams 24 do not necessarily have to be contiguous one against the other. The stirrup-shaped members can be made so as to permit a spacing between the two beams 24. It is also obvious that the design of the beams may vary in shape. For instance, the longitudinal axis of the beam could be curved, and its outer cross-section could be square, rectangular, round, oval, U-shaped or a combination thereof. What is important is that the stirrup-shaped member corresponds to the shape of the beam to be hooked.

As illustrated in FIG. 2, it may be seen that it is relatively easy to move apart the two dolly members when they are not in a hooked position. This constitutes a great improvement over the prior art in which telescopically interfitting tubular members require that the two tubular members be always interconnected while trying to adjust the distance between the two troughs.

The present arrangement is particularly interesting during the winter compared to the telescoping arrangement. With the latter, when the beams are covered with snow and ice, the sliding movement is considerably hampred. With the present arrangement, when the two dolly members are spaced in the correct position, the two beams are lowered one against the other and it is very easy to simultaneously remove the ice or the snow by the pressure of the stirrup-shaped members.

It should be obvious that the plate 32 could be dispensed with if the tire becomes sufficiently supported by the bars 12 and 16.

What I claim:

1. A dolly member for supporting a wheel of a towed vehicle comprising a rigid frame, a trough member supported by said frame for receiving a wheel of a towed vehicle, a pair of longitudinally aligned wheels pivotally mounted on one side of the frame, at least one beam transversely secured to said frame on the side opposite the wheels, a stirrup-shaped member rigidly secured sideways near the end of said beam, the open side of said stirrup-shaped member facing downwardly, whereby when a pair of said dolly members are disposed opposite one another and the beams are adjacent one another, the stirrup-shaped member is adapted to hook onto and firmly engage to the beam of the opposite dolly member so that the bottom side of said latter beam is the only one free for movement.

2. A member as recited in claim 1, wherein the cross-section of the stirrup-shaped member is similar in the cross-section of the beam so as to engage solidly over the latter.

3. A member as recited in claim 2, wherein the dolly comprises one beam, the said beam being slightly off center between the axis of each of the said wheels.

4. A member as recited in claim 3, wherein the beam is off said center by a distance corresponding to half the width of the said beam.

5. A member as recited in claim 2, wherein the beam and the stirrup-shaped member have a rectangular shape and are dimensioned so that the sides of the stirrup-shaped member are adapted to firmly grip the sides of the beam.

6. A member as recited in claim 1, wherein the said trough member comprises a rigid plate having the shape of a portion of a cylindroid, the axis of said cylindroid being substantially equidistant to the axis of each of the said wheels.

7. A member as recited in claim 6, wherein the frame has a rectangular contoured shape for supporting the said rigid plate.

* * * * *